Aug. 25, 1953 J. T. LIERLEY 2,649,835
AUTOMATIC CONTROL OF THE MOVEMENT OF PICTUREMAKING EQUIPMENT
Filed Sept. 15, 1949 3 Sheets-Sheet 1

INVENTOR.
JOHN T. LIERLEY,
BY
ATTORNEY.

Aug. 25, 1953  J. T. LIERLEY  2,649,835
AUTOMATIC CONTROL OF THE MOVEMENT OF PICTUREMAKING EQUIPMENT
Filed Sept. 15, 1949  3 Sheets-Sheet 2
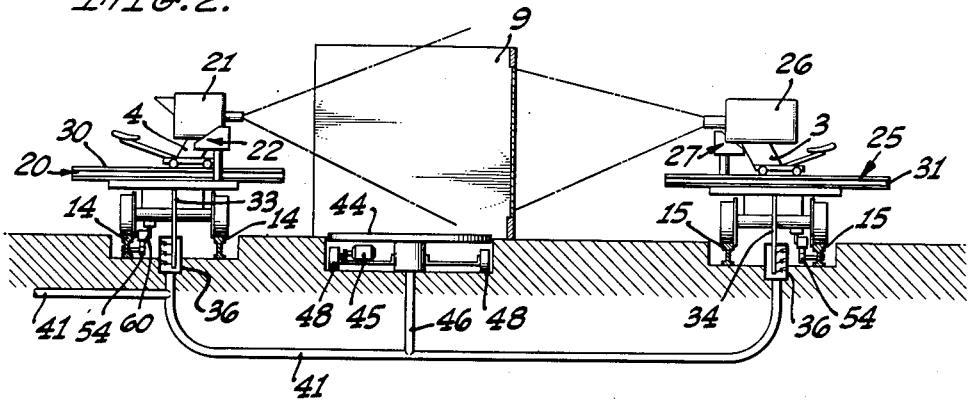
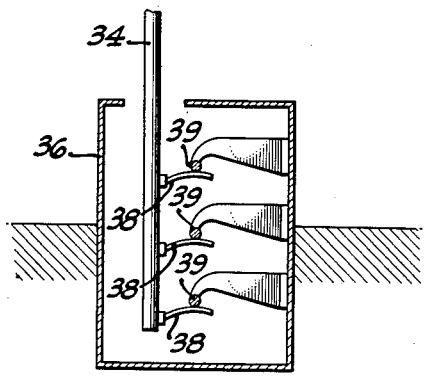
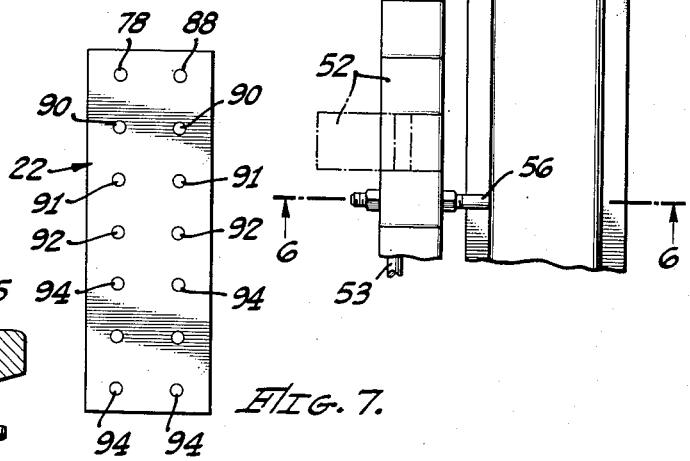
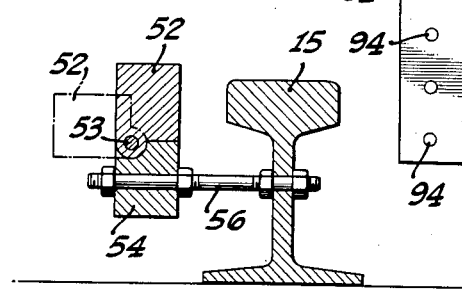
INVENTOR.
JOHN T. LIERLEY,
BY
ATTORNEY.

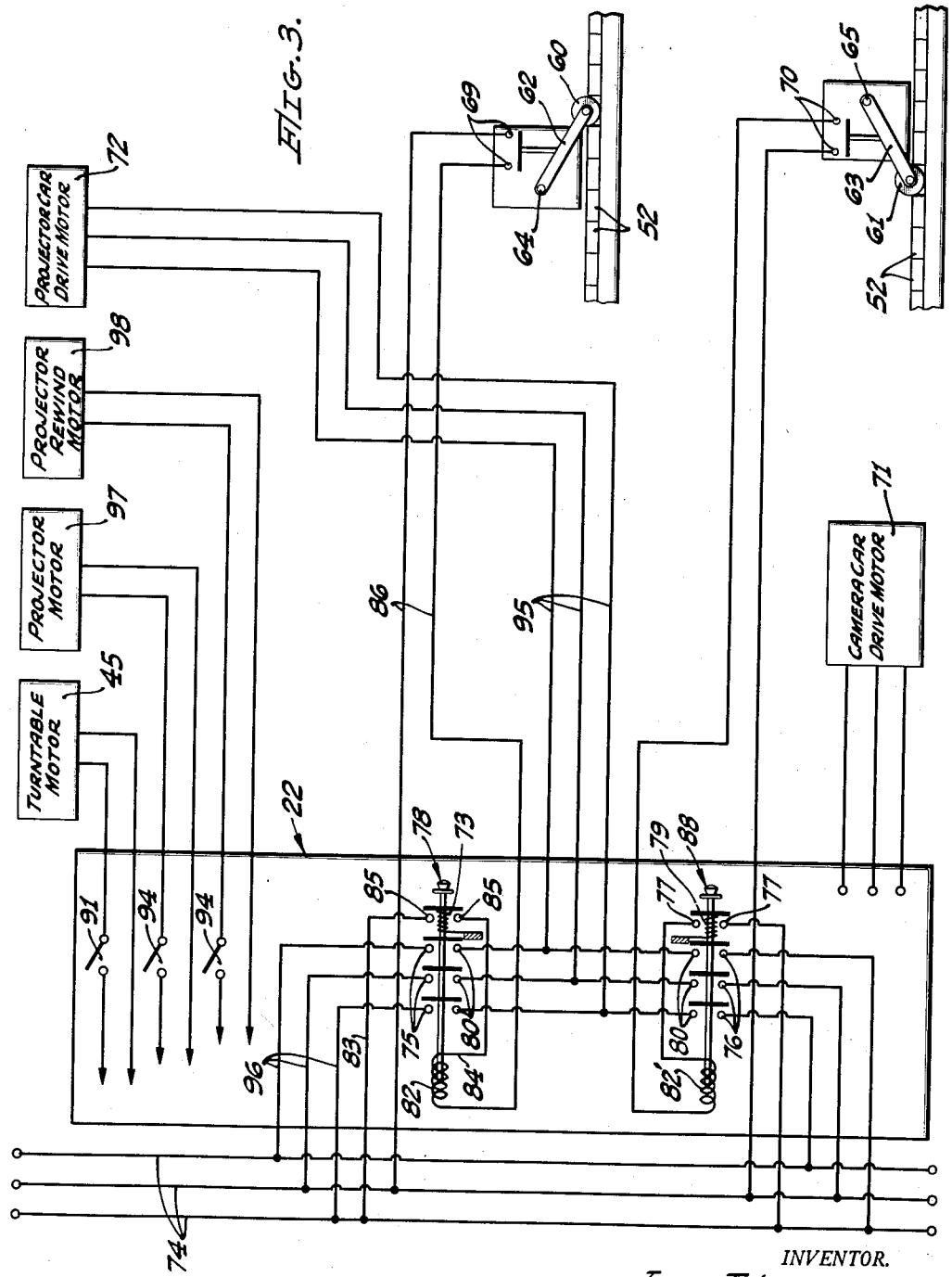

Patented Aug. 25, 1953

2,649,835

UNITED STATES PATENT OFFICE 2,649,835

AUTOMATIC CONTROL OF THE MOVEMENT OF PICTUREMAKING EQUIPMENT

John T. Lierley, Los Angeles, Calif.

Application September 15, 1949, Serial No. 115,844

10 Claims. (Cl. 88—16)

This invention relates to control circuits for apparatus employed in the production of motion pictures, and particularly to the remote control of cameras, projectors, and light blankets used in the production of motion pictures.

It is well-known that, in the "shooting" of sequences which are eventually assembled into a complete motion picture, the cameras are positioned with respect to the particular set and many times adjusted and moved during the photographing of the action on the set. Furthermore, many scenes in the production of motion pictures are made up of still and motion pictures projected on a process screen, in front of which the action occurs, both being photographed by the camera.

The present invention is directed to a control system which is adapted to be used in connection with a stage and set arrangement wherein the camera will be moved periodically in steps between predetermined positions, with respect to the sets to be photographed, according to a prearranged schedule. The controls for the camera and rear-projection process screen projector, if used, may be positioned on the camera carriage or on a separate car where they are readily accessible to the cameraman or director. Thus, when the photographing of one set is completed, the closing of a switch will automatically move the camera to the next predetermined correct position for photographing the next scene. In this manner, it will be unnecessary to experiment with the camera position during the actual photographing of the various sequences.

Although the invention has been disclosed in connection with the control of cameras and projectors, it is to be understood that it may also be used for controlling the movement and stop positions of revolving stages or of light blankets.

The principal object of the invention, therefore, is to facilitate the production of motion pictures.

Another object of the invention is to provide an improved method of and system for controlling the movement and location of photographing cameras or picture projectors.

A still further object of the invention is to provide an improved remote control system for rapidly controlling the movement and automatically controlling the stopping of motion picture apparatus at predetermined positions.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 2 is a cross-sectional view, taken along the line 2—2 of Fig. 1.

Fig. 3 is a combination circuit diagram and diagrammatic view of the control elements of the invention.

Figure 1:
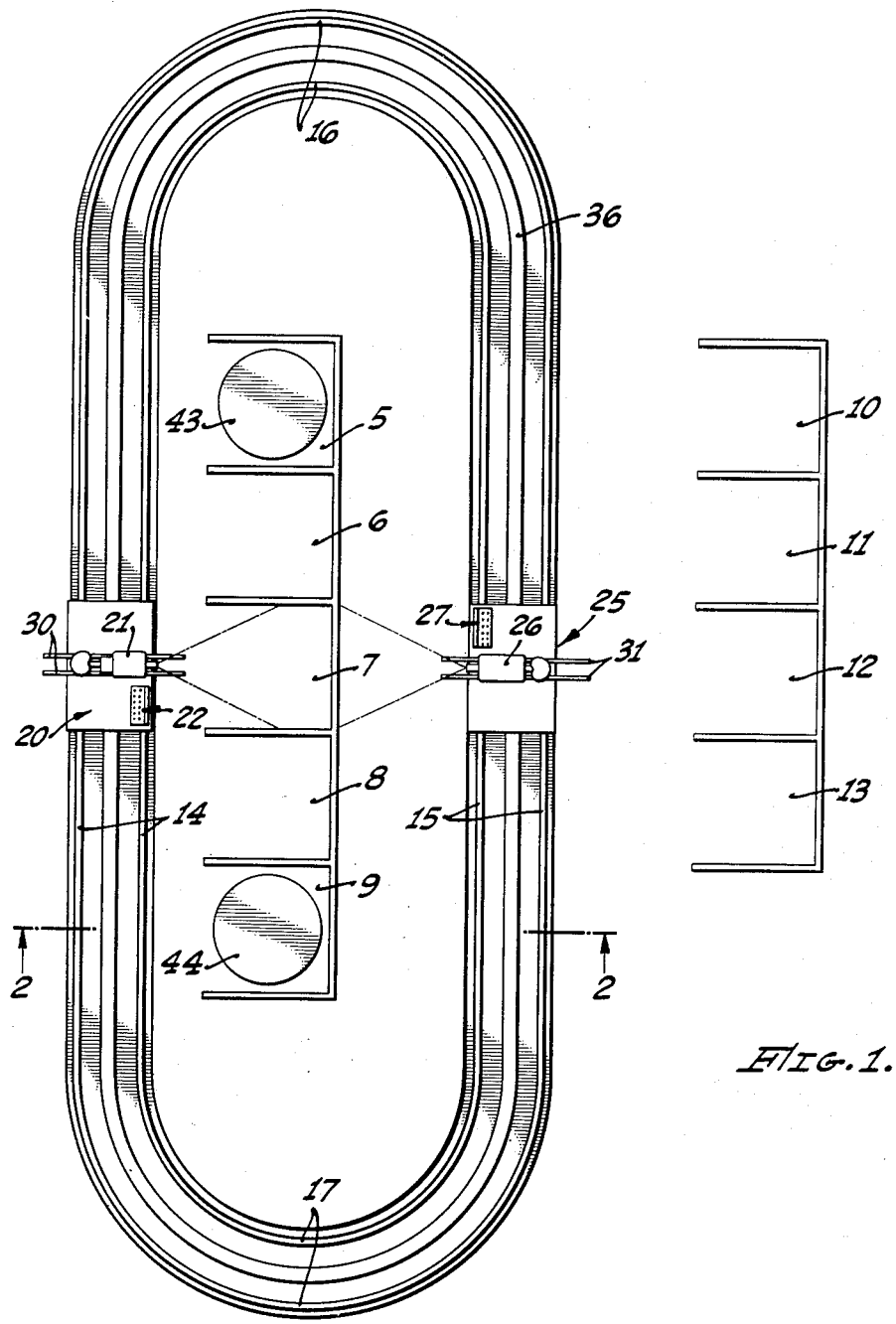
Fig. 1 is a general layout of a stage showing the equipment controlled by the invention.

Figs. 4, 5, and 6 are detailed views of the control track and trolley constructions, and Fig. 7 shows one arrangement of the control panels.

Referring now to the drawings, in which the same numerals identify like elements, a series of set cubicles 5, 6, 7, 8, 9, 10, 11, 12, and 13 are shown with a camera and projector track having straightaway rail sections 14 and 15 and curved end sections 16 and 17. Mounted on a camera car 20 is a camera 21 on a boom 4 and a control panel 22, and mounted on a projector car 25, is a background picture projector 26 on a boom 3 and a control panel 27. Each of the cars 20 and 25 has cross tracks 30 and 31, respectively, so that the camera and projector may be moved toward and away from a set by the cameraman or attendant.

As shown in Fig. 2, the tracks or rails are mounted so that the top surfaces thereof are flush with the floor of the stage, each car having a trolley extension 33 and 34, respectively, which extends into a gutter 36, between the track rails. The trolley has contact elements 38, which are adapted to make contact with trolley wires 39 attached to the sides of the gutter 36 (see Fig. 5). A conduit 41 contains the conductors to the power source, and also, to the trolley wires in the gutter.

Shown in cubicles 5 and 9, are turntables 43 and 44, which may be used to quickly vary the sets for certain sequences. These turntables have individual drive motors, one being shown at 45, and which is connected to conductors in conduit 41 over conductors in a branch conduit 46. These tables are on a plurality of wheels, such as shown at 48, and are controlled from the control panels 22 and 27.

To control the stopping of the camera or projector cars at predetermined positions, a control switch track is provided. This track is continuous and is constructed of a series of blocks 52 hinged at 53 on a support 54, which may be attached to one of the rails by bolts 56, or any other suitable manner. Riding or rolling on the blocks 52, are camera switch control wheels 60 and 61 mounted on arms 62 and 63, pivoted at 64 and 65, and which control connections between contacts 69 and 70, respectively, as shown in Fig. 3, and as will now be described. The control circuit may be for either the camera car motor, as shown at 71, or the projector car motor, as shown at 72, or for the motor of either of the turntables.

Referring now to the circuit in Fig. 3, power is supplied over a three-phase power line 74 from any suitable source to contacts 75 and contacts 76 in parallel. When switch 78 is pushed to drive the projector car in one direction, the power line is connected over contacts 75 and 80 and conductors 95 and 96 to the motor 72. The motor is then energized and the car begins to move. At this point, the wheel 60 may or may not be in an opening or notch in the control track made by the swinging back of one of the sections 52, as shown by the dotted lines in Fig. 6. If the wheel is dropped, the contacts 69 are opened. However, as soon as the car moves, the wheel 60 will be raised to close contacts 69 and energize a switch holding winding 82 over switch contacts 85, conductors 83, 84, and 86, to maintain switch 78 in closed position and keep motor 72 energized. The switch 78 may then be manually released, and it will remain closed in view of the holding circuit over contacts 69 and 85 and the car will continue to move until it arrives at a point where a section 52 has been swung out of position. At this point, wheel 60 will drop, which will open contacts 69 and release switch 78 to stop the car or turntable, the switch being returned to normal open position by a bias spring 73.

Switch 78 starts the car in one direction and wheel 60 stops it, while a similar switch 88 starts the car in the opposite direction and wheel 61 stops it. The switch 88 has the same construction and contacts as the switch 78, except that the motor 72 is connected to the line 74 in reverse, when contacts 76 and 80 are made, the contacts 70 and 77 being in series to control the stopping of the car when either is broken. Springs 73 and 79 open the respective switches when the coils 82 and 82' are de-energized. Each of the cars' control panels is equipped with a pair of similar switches, which will function to control the cars in either direction and stop them automatically in accordance with pre-arranged plan. A circular control track for the turntables and similar switches will provide automatic stopping action therefor, as well as for the movement of any equipment on the stage.

In operation, a plurality of sets are pre-arranged or dressed and the positions of the camera, projector, and other equipment are determined for each set in accordance with the action to take place on the set. When this has been determined, the proper segments 52 under the wheels are swung out of position, so that when the camera car is moved to any particular set, it will automatically stop at the required position. Two or more camera positions for each set may be pre-set in the same manner. Thus, the cameraman or director need simply push the desired control button to move the car to the next desired position. Similarly, the background projector car can be controlled.

In Fig. 7, a plan view of a control panel is shown, the panel including a pair of projector car switches 78 and 88, a similar pair of switches 90 for the projector car, one or more pair of switches 91 for controlling the turntables, a pair of switches 92 for the lights, and a group of switches 94 for controlling the camera and sound reproduces and lamps. The controls for projector motor 97 and projector rewind motor 98 are shown connected to panel 22.

The above described control system thus permits a predetermination of a plurality of camera, projector, and turntable stage positions, which may be duplicated later by the simple actuation of only start switches. It is to be understood that other types of controls could be used for obtaining selective positioning, such as a continuous gear rack along the track with a car driving pinion, the rack having removable sections, but the scope of the invention is defined by the appended claims. The specific control circuit may be used to control other equipment, while temporary camera tracks may be provided with automatic stop positions.

I claim:

1. A system for rapidly and accurately stopping a camera and a projector, each of which is moved on tracks by an electrical motor between predetermined positions on opposite sides of a plurality of sets to be photographed, comprising tracks for said camera and said projector, means for energizing the electrical moving motor for said camera and the electrical moving motor for said projector, a motor energizing circuit for said camera moving motor and for said projector moving motor, each circuit including a manual contact switch and a traveling contact switch, a control track for said traveling switches, and means for adjusting said track at predetermined points to actuate said traveling switches and open said circuits at said respective points to stop said camera at a certain point with respect to the stopping point of said projector.

2. A system in accordance with claim 1, in which said control track includes segments movable out of contact position with said traveling switch to actuate said switch at positions where said segments are moved out of position.

3. A system in accordance with claim 1, in which said manual contact switch includes a plurality of contacts, an armature for making said contacts, and electrical means for holding said contacts in closed position, said electrical means being energized and de-energized by said traveling switch.

4. A system for rapidly and accurately positioning a camera in photographing positions adjacent a series of sets, comprising a plurality of sets to be photographed, a camera, means mounting said camera for transporting said camera to predetermined photographing positions, a power circuit for said transporting means, a manually operable start switch for said power circuit, a traveling stop switch, a circuit through said start and stop switches for holding said start switch in closed position when said switches are closed, and means located at said predetermined positions for actuating said traveling stop switch for de-energizing said start switch to permit said start switch to open to break said power circuit.

5. A system for rapidly and accurately positioning a camera in photographing positions adjacent a series of sets, comprising a plurality of sets to be photographed, a camera, means mounting said camera for transporting said camera to predetermined photographing positions, a power circuit for said transporting means, a manually operable start switch for said power circuit, a traveling stop switch, a circuit through said start and stop switches for holding said start switch in closed position, and means located at said predetermined positions for actuating said traveling stop switch for de-energizing said start switch to permit said start switch to open, said last mentioned means including a segmented track and traveling means for contacting said track, the adjustment of the segments of said track determining the stopping position of said camera.

6. A photographing system, comprising an arrangement of sets to be photographed at different fixed locations, a movable camera, a track, a car on said track for transporting said camera to predetermined set photographing positions, motor means for moving said car, a control track adjacent said car track, a starting switch control panel on said car for controlling the energization of said motor means, a power supply for said motor means, a car stopping switch carried by said car and actuated by said control track at said predetermined positions, and circuit means interconnecting said starting switch and said stopping switch, said circuit means energizing said starting switch through said stopping switch, said stopping switch being actuated by said control track to de-energize said starting switch.

7. A photographing system in accordance with claim 6, in which a projector to be moved to certain fixed locations for cooperation with said camera, a car for moving said projector, and starting and stopping switches for said projector are provided, said starting switches being on said control panel.

8. A photographing system in accordance with claim 6, in which certain of said sets to be photographed are positioned on turntables, and said control panel includes starting switches for controlling the movement of said turntables.

9. A system for photographing a spaced series of scenes from predetermined positions adjacent said scenes with a camera movable from scene to scene by an electrical motor comprising a camera for photographing one of said scenes when said camera is in one of said predetermined positions adjacent said scene, a power source, a motor for moving said camera, a track for guiding said camera when moved by said motor, a hand operable switch at said camera for controlling the connection of said source to said motor at the end of said photographing to move said camera from said one position to another predetermined position adjacent another scene, a mechanically operable switch for controlling the disconnecting of said source from said motor at said other position adjacent said other scene, and mechanical means associated with said track at said other position for actuating said last mentioned switch, said camera photographing said other scene at said other position.

10. A system for photographing a spaced series of scenes from predetermined positions with a camera movable by a first motor from scene to scene, said scenes including a projected scene from a projector movable by a second motor from scene to scene comprising a camera for photographing one of said scenes in one of its predetermined positions adjacent said scene, a projector for projecting a portion of the scene to be photographed by said camera, a power source, a first motor for moving said camera, a track for guiding said camera when moved by said first motor, a manually operable switch for controlling the connecting of said source to said first motor to move said camera to another of its predetermined positions adjacent another scene, a second motor for moving said projector, a second track for guiding said projector when moved by said second motor, a manually operable switch for controlling the energization of said second motor to move said projector to another of its predetermined positions adjacent another scene, a second mechanically operable switch for controlling the disconnecting of said source from said second motor at its said other position, a second mechanically operable switch for controlling the disconnecting of said source from said first motor at its said other position, and means associated with said tracks at said other positions for actuating said mechanically operable switches, said camera photographing said other scene and the scene projected by said other projector in their other positions.

JOHN T. LIERLEY.

References Cited in the file of this patent

UNITED STATES PATENTS

| Number | Name | Date |
| --- | --- | --- |
| 1,294,686 | McCormick | Feb. 18, 1919 |
| 1,400,091 | Munderback | Dec. 13, 1921 |
| 1,563,550 | Brown | Dec. 1, 1925 |
| 1,667,457 | Daley | Apr. 24, 1928 |
| 1,729,397 | Meuche | Sept. 24, 1929 |
| 1,792,915 | Lewis | Feb. 17, 1931 |
| 2,030,300 | Jackman | Feb. 11, 1936 |
| 2,077,104 | Geib | Apr. 13, 1937 |
| 2,123,529 | Goosson | July 12, 1938 |

FOREIGN PATENTS

| Number | Country | Date |
| --- | --- | --- |
| 439,969 | Great Britain | Dec. 18, 1935 |

OTHER REFERENCES

Alton, John, "Transparency Set Turntable," article on page 22 of International Projectionist, Nov. 1946 (copy in Div. 7).